March 12, 1957 R. W. FENEMORE 2,785,353
APPARATUS FOR POSITIONING A MOVABLE MEMBER WITH REFERENCE TO A DATUM REFERENCE POINT OR POSITION
Filed Sept. 21, 1953
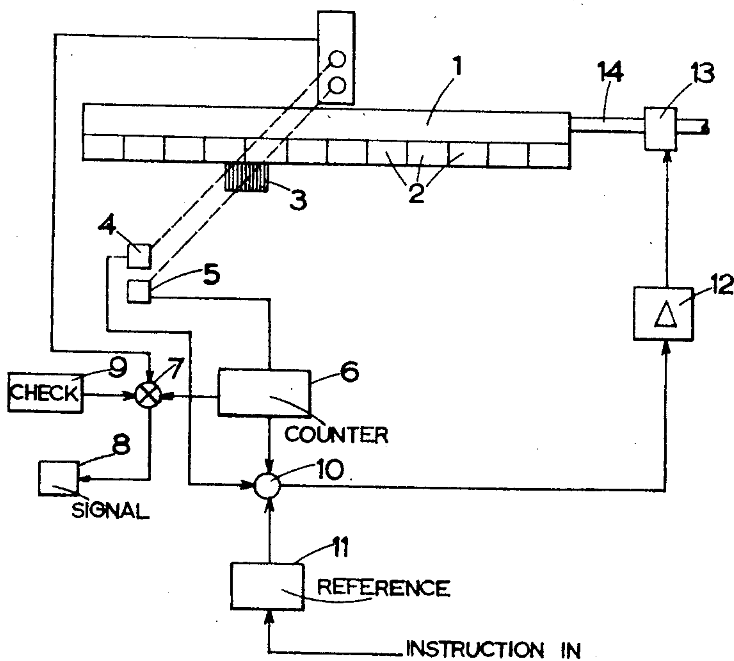
Inventor
RONALD WILLIAM FENEMORE
By Fred M Vogel
AGENT

United States Patent Office 2,785,353

Patented Mar. 12, 1957

2,785,353

APPARATUS FOR POSITIONING A MOVABLE MEMBER WITH REFERENCE TO A DATUM REFERENCE POINT OR POSITION

Ronald William Fenemore, Coulsdon, England, assignor to The Mullard Radio Valve Company Limited, London, England, a British company Application September 21, 1953, Serial No. 381,459

Claims priority, application Great Britain August 21, 1953

3 Claims. (Cl. 318—28)

The invention relates to apparatus for the accurate positioning of a movable member with reference to a datum reference point or position, for example for positioning a machine tool table or slide, or in fire control applications.

The apparatus of the present invention may have applications to many different devices where accurate positioning of a member making a sliding or angular movement is desired. For example in a jig boring machine which is employed for extremely accurate machining operations rectilinear movements of the table must be made with great precision. These movements are at present manually controlled and vernier scales and optical magnification are employed to ensure as far as possible the desired degree of accuracy.

The object of the invention is to render such setting operations semi or fully automatic and with a very high degree of accuracy and certainty.

According to the invention apparatus for the accurate positioning of a movable member with reference to a datum reference point or position comprises a first structure defining equally spaced relatively coarse reference positions, for example a first graduated scale, a second structure defining equally spaced relatively fine reference positions, for example a second graduated scale, one of said structures being carried on the movable member and the other associated with the datum position for co-operation with one another, optical means for scanning said scales in unison, photo-electric means for producing an electrical pulse train corresponding to the scanning of the second scale, means for counting said pulses, means for comparing said count at the instant that a selected relatively coarse reference position is scanned with a reference count representing the desired position of the movable member relative to the datum position and means for setting said first scale reference position into coincidence with the second scale reference position denoted by the said reference count.

Other features of the invention will be apparent from the following description of one embodiment which is given by way of example only with reference to the accompanying drawing which shows diagrammatically its application to a machine tool table.

In the drawing the table 1 has secured to it a scale which may be of transparent material having equally spaced markings 2 which may for example be one-tenth of an inch apart and one twenty-thousandth of an inch in width. These dimensions are only given by way of example since others may be chosen depending upon the circumstances of the application for example if the scale is attached to a member designed to make angular movements the scale could be engraved in degrees and/or minutes.

At a suitable position in relation to the table a scale 3, having a length equal to the spacing between the markings 2 is fixed for example on the table supporting bed (not shown) and this scale carries markings one ten-thousandth of an inch apart and one twenty thousandth of an inch in width. The scale 3 may also be of transparent material.

Associated with the two scales are two photo-electric devices 4, 5. A light source or sources are arranged so that a first light beam traverses the scale 2 and enters device 4 and a second light beam traverses scale 3 and enters device 5. The light beams are not stationary but are caused, by suitable means, for example an oscillating optical element or elements to scan back and forth along the scales 2, 3 at any suitable frequency. The beam scanning the scale 2 is vertically above the beam scanning the scale 3 and the beams move simultaneously and in unison and to an extent sufficient for the scale 3 to be completely scanned. The relative positional accuracy of the beams must be equal to or greater than the accuracy of the scale markings. The output from the photo-electric device 5 will consist of a pulse train in this example one thousand pulses for each scan of the scale 3 and this output is fed to an electronic counter 6 which may be of the binary type.

As a precautionary measure the count at the end of each scan is checked by passing the output from the counter at this moment to a gate device 7 into which is fed an input from a check device 9 representing a count of one thousand. In the case of any discrepancy the gate passes a signal to a warning device 8 which may be of the aural or visual kinds.

The output from the photo-electric device 4, which will consist of a single pulse only when one of the scale 2 markings lies between the ends of the scale 3, is fed to a comparison gate 10 which opens whenever the pulse appears.

Also fed into the comparison gate is the output from the counter 6 and an input from a reference device 11, which input represents the desired dimension from a datum reference point to which the table is to be set. The reference device 11 has such a form, for example when the counter 6 is a binary counter the device 11 will provide output potentials corresponding to the output potentials of the stages of the binary counter, that a direct comparison may be made between the observed count and the reference count and the device 11 may be set, for example, manually or by a coded instruction to any desired number. Thus, when the devices 6 and 11 are of the binary counter type the comparison gate performs the functions of continuously comparing the states of the corresponding stages of each counter and developing an error signal of suitable magnitude and sense. The error signal is only released for use when the gate is operated as above described.

In order to explain the operation of the above described part of the apparatus let it be assumed for example that it is desired to set the table at distance equal to 29.5617 inches from its datum reference point. The initial movement of the table to the 29.5 inch setting may be effected manually or by independent means it being necessary only that the 295th division on the scale 2 should lie somewhere between the ends of the scale 3. The photo-electric devices 4, 5 counter 6, gates 7 and 10, check device 9 and reference device 11 are then energized and scanning of the scales commences. When the pulse from device 4 opens the gate 10 the error signal resulting from the comparison of the count effected by counter 6 up to that moment with the reference count set up in reference device 11, in this case 617 is released. The error signal is delivered to a servo-device 12, which controls, through suitable means, for example as shown a gear box 13 and lead screw 14, the movement of the table in the appropriate direction. At the end of the scan of scale 3 the total count is checked as above described and the scanning proceeds if the count is correct. Scanning proceeds uninterruptedly and at any desired frequency.

When the table has reached the desired setting a count of 617 will be emitted by the counter 6 at each scan at the instant the gate 10 is operated as above described resulting in a zero error signal and the apparatus may remain energized so that should the table tend to move during the machining operations this will be immediately detected and rectified by operation of the servo-control.

The invention is not limited to the exact embodiment above described since the principle of scanning, counting and checking may be carried out in various ways depending upon the particular circumstances of application of the invention. Further the operation of servo-control means by the signal emitted by the gate 10 is not essential, it may in some cases be sufficient to display the error as a visual indication and to control the movement directly or indirectly by manual control. Although the scales have been described as transparent it will be obvious that reflected instead of transmitted light may be employed in which case the scales may be opaque. In certain cases the scale 2 may be made the fixed scale and the scale 3 be carried on the moving member.

Other changes and adaptions will be obvious to those skilled in the art in order to apply the invention to particular cases as they arise in practice.

I claim:

1. Apparatus for accurately positioning a movable member with reference to a datum reference point comprising a first relatively coarse graduated scale structure, a second relatively fine graduated scale structure adjacent to said first scale structure, one of said scale structures being carried on said movable member, optical means for continually scanning said scales in unison, photo-electric means for producing an electric pulse train corresponding to the scanning of said second scale, means for counting said pulses, means for comparing said count at the instant that a selected, relatively coarse reference position is scanned with a reference count representing the desired position of the movable member relative to the datum reference point, and means for setting said first scale reference position into coincidence with said second scale reference position as denoted by said reference count.

2. An apparatus as set forth in claim 2 further comprising a servo-mechanism wherein the comparison of said count is used as an error signal to control the position of said movable member through said servo-mechanism.

3. An apparatus as set forth in claim 2 further comprising a warning device, and the number of pulses forming one complete scan of said second scale being compared with the reference count at the termination of each scan, and means for causing any discrepancy between the scanning and the reference count to result in the energization of said warning device.

References Cited in the file of this patent

UNITED STATES PATENTS

| | | |
|---|---|---|
| 2,375,665 | Koulicovitch | May 8, 1945 |
| 2,524,807 | Kallmann | Oct. 10, 1950 |
| 2,537,427 | Seid et al. | Jan. 9, 1951 |